(12) United States Patent
Silverthorne et al.

(10) Patent No.: US 7,594,004 B2
(45) Date of Patent: Sep. 22, 2009

(54) SYSTEM, COMPUTER PRODUCT AND METHOD FOR EVENT MONITORING WITH DATA CENTRE

(76) Inventors: Paul Silverthorne, R.R. #1, Gilford, Ontario (CA) L0L 1R0; Jon Russell, 512-63 Callowhill Drive, Etobicoke, Ontario (CA) M9R 2L6; Victoria Elbaz, 78 Bideford Avenue, Toronto, Ontario (CA) M3H 1K4

( * ) Notice: Subject to any disclaimer, the term of this patent is extended or adjusted under 35 U.S.C. 154(b) by 712 days.

(21) Appl. No.: 10/215,030

(22) Filed: Aug. 9, 2002

(65) Prior Publication Data
US 2004/0030762 A1 Feb. 12, 2004

(51) Int. Cl.
*G06F 15/173* (2006.01)

(52) U.S. Cl. ............... 709/223; 709/202; 709/204; 709/203; 709/224; 705/1; 705/22; 705/26; 705/75; 705/28; 725/102

(58) Field of Classification Search ......... 709/201–204, 709/223–226; 702/1, 183, 127, 189; 700/28–30; 705/26–28, 100; 345/716; 797/6–10
See application file for complete search history.

(56) References Cited

U.S. PATENT DOCUMENTS

| | | | |
|---|---|---|---|
| 6,381,604 B1 * | 4/2002 | Caughran et al. | 707/10 |
| 6,701,271 B2 * | 3/2004 | Willner et al. | 702/127 |
| 6,836,773 B2 * | 12/2004 | Tamayo et al. | 707/6 |
| 6,850,252 B1 * | 2/2005 | Hoffberg | 715/716 |
| 6,853,920 B2 * | 2/2005 | Hsiung et al. | 702/1 |
| 6,888,927 B1 * | 5/2005 | Cruickshank et al. | 379/88.11 |
| 6,901,380 B1 * | 5/2005 | Bremers | 705/27 |
| 7,024,474 B2 * | 4/2006 | Clubb et al. | 709/223 |
| 2001/0029613 A1 * | 10/2001 | Fernandez et al. | 725/105 |

* cited by examiner

*Primary Examiner*—Jude J Jean Gilles

(57) ABSTRACT

A system, computer product and method for monitoring and disseminating data form a plurality of electronic devices via the Internet is provided. The plurality of electronic devices, or further electronic devices connected to the plurality of electronic devices, generate signal data. A computer product of the present invention is loaded on the electronic devices such that the signal data is collected via the Internet at a remote web server. The web server stores this data in a database such that a client can monitor its signal data by means of the web server, via the Internet. The present invention also permits the client to disseminate the signal data, including signal data meeting alarm parameters, based on business rules established by the client. A method for deploying the system of the present invention across a plurality of electronic devices, including electronic devices across a plurality of locations is also provided.

2 Claims, 3 Drawing Sheets

SYSTEM, COMPUTER PRODUCT AND METHOD FOR EVENT MONITORING WITH DATA CENTRE

FIELD OF THE INVENTION

This invention relates in general to systems, computer products and methods for monitoring and disseminating data from a plurality of devices via the Internet. This invention relates more particularly to signal data monitoring via the Internet across a plurality of alarm devices, including across a plurality of locations.

BACKGROUND OF THE INVENTION

Intelligent electronic devices for generating signal data are well known. These intelligent devices are often connected to a known management system or controller.

For example, a series of intelligent devices are deployed across a building and connected to a building management system or "BMS". The intelligent devices connected to the BMS may include motion detector devices, or various devices commonly associated with an HVAC system (Heating, Ventilation and Air-Conditioning) such as temperature, humidity etc. sensors.

Still other intelligent devices monitor, for example, the cash levels present in ATM machines, or the functioning of manufacturing equipment and so on.

In either case the electronic devices in question generate signal data. This signal data may relate to the environment of the electronic device, in the sense of a facility or equipment with which the electronic device is associated, or the operation of the electronic device itself. In either case, operators may desire to monitor and disseminate signal data, and access reports based on this signal data.

There are known solutions for providing remote access to data generated by an intelligent device, or a management system connected to a plurality of intelligent devices.

For example, www.automatedlogic.com discloses a particular solution for interfacing with a BMS for the purpose of remote administration thereof, and generating and viewing reports based on data made available to the BMS, on a remote basis. This solution, and other similar ones, such as those disclosed at www.automatedbuildings.com, www.tridium.com\niagara, the "TALON" solution described at www.sbt.siemens.com, and the "WIRELESS MATRIX" solution disclosed at www.intersatcorp.com all provide for solutions for interfacing with a management system, including for example by means of electronic mail notification to a remote device, or electronic mail notification directly from an electronic device to a remote device.

However, it is quite common that a single operator will be connected to a plurality of management systems, or intelligent devices distributed across numerous locations. This is the case where, for example, a plurality of buildings is under operation by a single entity, but a BMS is associated with each of these buildings. Similarly, an assembly line may include more than one series of machines, each having its own management system, whereby management of the assembly line overall requires access to each of the separate management systems. As a still further example, an ATM is often associated with its own management system, whereas a bank may operate thousands of ATMs in multiple locations.

Therefore what is required is a system, computer product and method for providing a central system for monitoring, accessing and disseminating data from a plurality of electronic devices or related management systems. It is desirable that the central system be easy to operate. It is further desirable to associate the central system with a data centre accessible via the Internet to provide ready access to signal data generated by the plurality of electronic devices or related management systems.

SUMMARY OF THE INVENTION

One object of the present invention is to provide a system, computer product and method for providing a data centre connected to the Internet which can automatically access, evaluate, store and disseminate data collected from a plurality of remote locations. The data is collected from intelligent devices connected to a gateway device whereby the gateway device formats the data and communicates the data to the data centre.

BRIEF DESCRIPTION OF THE DRAWINGS

A detailed description of an embodiment of the present invention is provided herein below by way of example only and with reference to the following drawings, in which.

Figure 1:
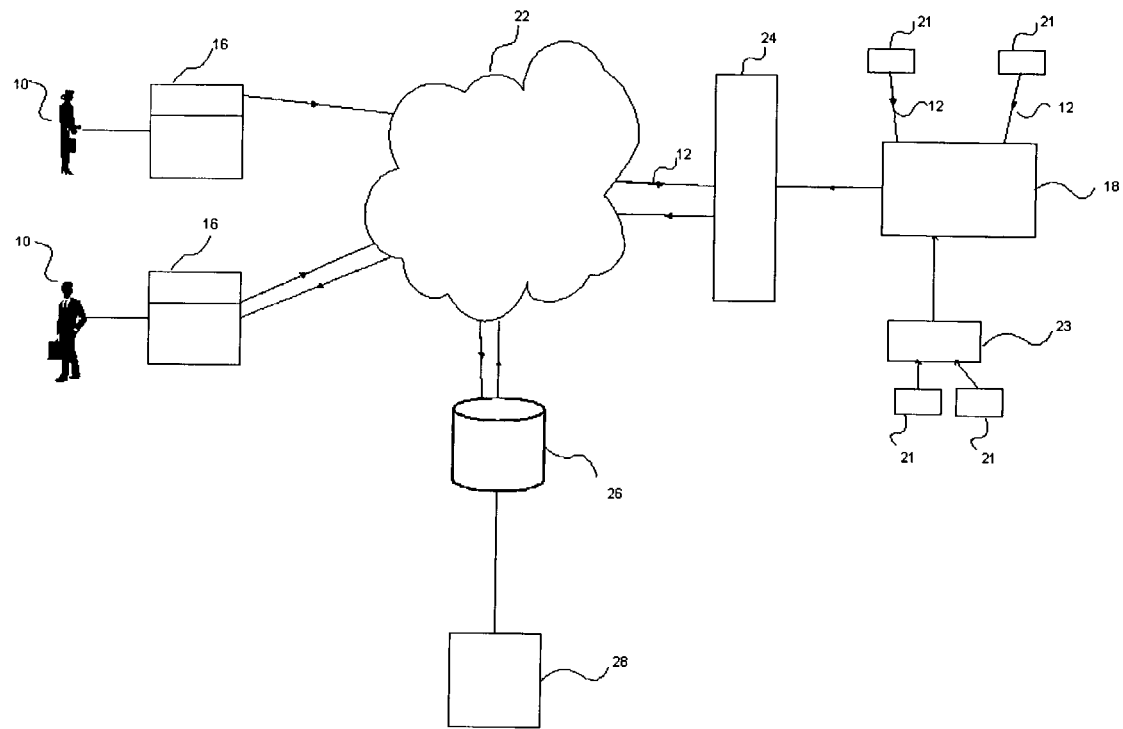
FIG. 1 is system resource flowchart illustrating the resources of the system of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Electronic devices that are adapted to communicate with remote electronic devices via a communication system such as the Internet, or Intranet connected to the Internet, are well known. These devices, a type of which is commonly referred to as a gateway device, are becoming more and more common and are often deployed across multiple locations for multiple purposes, such as monitoring and facilitating remote access to data, or facilitating the control of other devices connected to the gateway device. A gateway device typically includes a microprocessor, memory and an integral communication facility that permits a network connection via a serial port, in a manner that is known.

Figure 3:
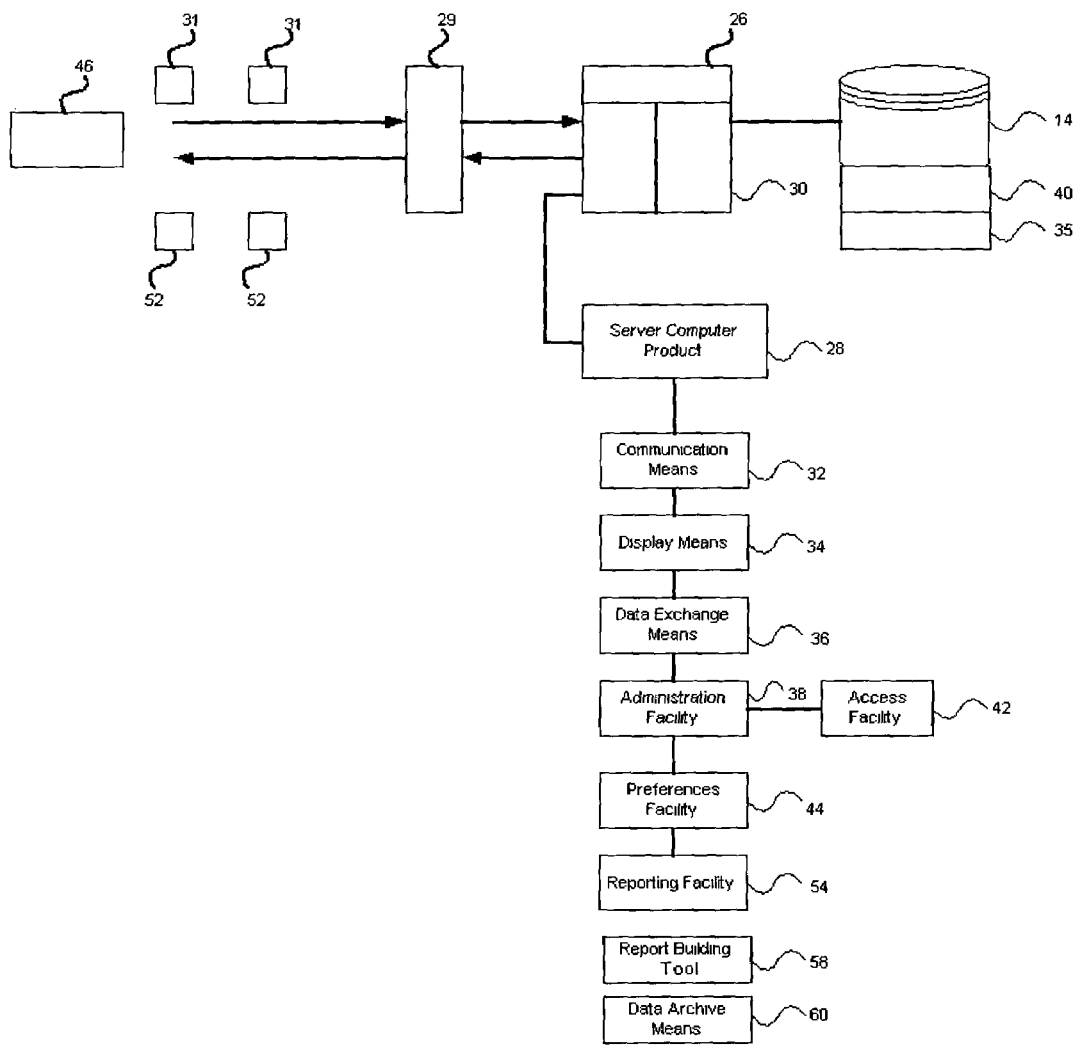
FIG. 3 is a program resource flowchart illustrating the resources of the server computer product of the present invention.

Referring to FIG. 1, there is illustrated a system resource flowchart illustrating the resources of the present system, in an illustrative implementation of same in the environment of multiple clients 10 accessing their respective signal data 12 from database 14 (shown in FIG. 3). Each of the clients 10 is associated with a client computer 16 which may include any manner of device having a microprocessor, such as a personal computer, WAP device, personal digital assistant ("PDA"), wireless pager or the like.

At least one gateway device 18 is implemented in accordance with the present invention to detect events to produce signal data 12 in a manner that is well known. The gateway device 18 may in turn be connected in a manner that is known to an internal network (not shown) which in turn connects the gateway device 18 to one or more other electronic devices 21 capable of generating signal data 12. These electronic devices may include a series of electronic devices connected to a management system 23, whereby the management system 23 controls the series of electronic devices 21 and generates signal data 12.

The signal data 12 generally includes data in the form of ASCII or some other computer readable format.

The signal data 12 contemplated by the present invention may include a series of events or alarms defined in accordance with parameters generally defined by the devices connected to the gateway device 18 or to the management system 23. Therefore in accordance with this invention, the gateway device 18 receives information regarding events including alarms from such electronic devices 21, including in some cases via one or more management systems 23. These events may relate to environmental conditions, or operating conditions of other systems or devices. It should also be understood that the gateway device 18 is also adapted to generate data regarding its own operating conditions, and for the purposes of this invention, signal data 12 includes such information.

For example, in the context of a BMS in particular, these parameters may relate to minimum and/or maximum threshold values related to temperature data, humidity data, data concerning status of alarm systems, and so on, in the context of a management system used in relation to a BMS.

The gateway device 18 is a known intelligent device that includes a microprocessor, an operating system (not shown) such as WINDOWS CE™, a memory and one or more serial ports (also not shown), all provided in a manner that is known. The gateway device 18 is connected to a communication network by means of a known communication interface (not shown), and in accordance with one embodiment of the invention to the Internet 22, as shown in FIG. 1. This connection to the Internet 22 may be direct as between the gateway device 18 and the Internet, or via a LAN connection, as is well known in the art. The use of the Internet in accordance with the present invention has the advantage of the cost efficiencies that are inherent in transacting business electronically via the Internet.

It is also desirable to provide some form of known layer of security as between an open network such as the Internet 22 and the gateway device 18. This may be provided in accordance with a variety of known solutions, for example, by means of network security means 24 such as a proxy server or firewall, as illustrated in FIG. 1.

In accordance with one aspect of the method of the present invention, the plurality of gateway devices 18 are deployed in accordance with the requirements of the various clients 10. In a representative implementation of the present invention, a plurality of gateway devices 18 is deployed across several locations. In accordance with one particular embodiment of the present invention this is achieved by loading a gateway program 27 of the present invention to each gateway device 18 by means of a known gateway loader program (not shown). This gateway loader program is a known tool for downloading different versions of gateway program 27 depending on a number of different criteria, including the nature of the electronic devices 21 connected to the gateway device, the specifications of the particular gateway device 18, and desired functions of the gateway device 18 in relation to forwarding of signal data 12 as explained below. The gateway loader program is best understood as a known program for delivering control routines to a series of electronic devices, including gateway devices 18. The gateway loader program includes a menu of several different routines corresponding, for example, to different gateway devices 18, the electronic devices 23 with which the gateway devices 18 are meant to interface, or the range of values 29 related to signal data 12, as further explained below. The different routines are selected by an operator by selecting an icon that corresponds to the appropriate computer program, and loads same, in a manner that is known.

Therefore one aspect of the present invention is the computer product or gateway program 27 located at the gateway device 18 that provides the functions described herein, and in particular communication of signal data 12 to the server computer 26 in accordance with the present invention.

Figure 2:
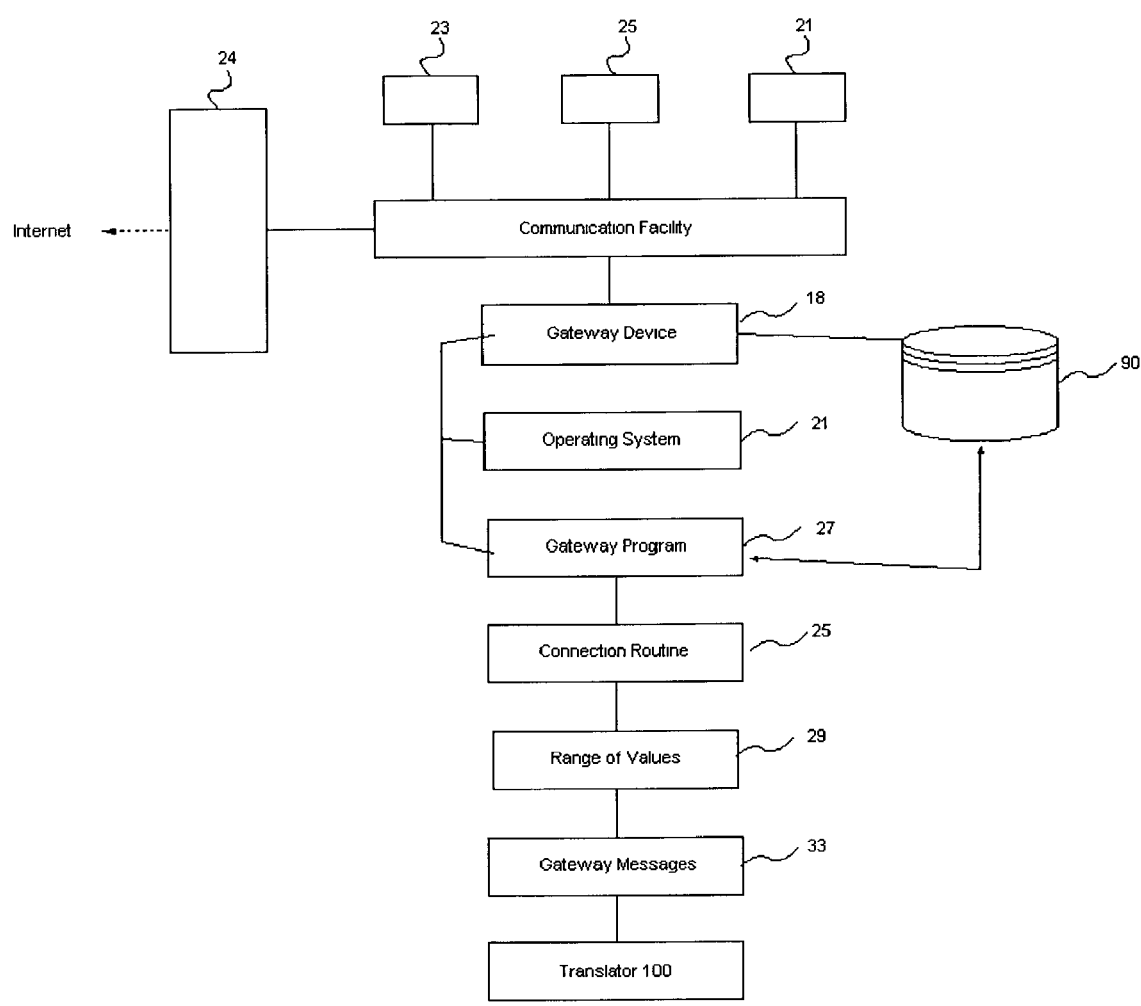
FIG. 2 is a program resource flowchart illustrating the resources of the gateway computer product of the present invention.

As best illustrated in FIG. 2, in one embodiment of the present invention, the gateway program 27 provides to the memory 90 the IP address of server computer 26. The gateway program 18 also includes a known connection routine 25 whereby when the gateway device 18 is connected to the Internet 22, the gateway device 18 immediately contacts the server computer 26, as particularized below.

Further in accordance with one aspect of the method of the present invention, as well as a feature of the gateway program 27, the gateway device 18 is provided with means for understanding signal data 12 received from the electronic device 21 or management systems 23. From the perspective of efficient allocation of resources as between the server computer 26 described below, and the various gateway devices 18 connected to the server computer 26, it is desirable that the server computer 26 receive signal data 12 via the gateway devices 18 in a form that the server computer 26 comprehends. Therefore, in the particular embodiment of the present invention described, the extent to which signal data 12 received at one or more gateway devices 18 is not readily understood by the server computer 26, the gateway program 27 includes a known translator 100 for translating signal data 12 into a predetermined format for delivery to server computer 26, as explained below.

In a still further particular embodiment of the invention described herein, the gateway program 27 also includes functionality whereby signal data 12, or particular signal data 12 meeting predetermined criteria, is buffered, or accumulated in batches, in a manner that is known, before delivery to the server computer 26. This is to promote efficient use of the resources of the server computer 26. For example, in an implementation of the present invention whereby a gateway device 18 is connected to an electronic device 21 that generates data on an ongoing basis, not all of which is of immediate interest to the customers of the operator of the present invention, signal data 12 meeting these criteria is ideally buffered before delivery to the server computer 26. In relation to this particular embodiment therefore a range of values 29 defining which data is to be buffered, for example, is provided to the memory 90 by the gateway loader program in a manner that is known.

It should be understood that the gateway device 18, depending on the particular gateway device 18 as well as the other electronic devices 21 or the management systems 23 to which the gateway device 18 may be connected, may generate a great deal of data. For example, a gateway device 18 connected to a BMS may receive data regarding the various values detected by humidity sensors, temperature sensors and the like. While a BMS is generally adapted to generate alarms, i.e. signal data 12 that meets predetermined threshold values, in another aspect of the present invention it is contemplated that the range of values 29 provided by the gateway program 27 may effectively modify what constitutes an alarm that is passed on as signal data 12 to the server computer 26. This may be desirable, for example, in the case of a relatively old BMS where the control programming is relatively difficult to modify, such that it is easier to implement modifications to what constitutes an alarm at the gateway device 18 than at the BMS.

When data is received by the gateway device 18 that falls within the particular range of values 29, or which simply constitutes signal data 12 where the gateway device 18 does not differentiate between data received from the electronic devices 21 or management system 23, the gateway program 27 is adapted to send an electronic message or gateway electronic message 33 to the server computer 26 in a manner that is known, as best shown in FIG. 2. In one particular embodiment of the present invention the gateway electronic message 33 is sent in JMS. It should be understood that the gateway program 27 provides means for programming the particulars to the dispatch of such gateway electronic messages 33, including for example the frequency thereof.

The system of the present invention, as illustrated in FIG. 3, includes a server computer 26, having its own connection to the Internet 22. The hardware comprising server computer 26 is provided in a manner that is well-known. The computer product 28 of the present invention resides at server computer 26.

Said server computer 26 is provided in a manner that is well-known and includes a processor and a database 14. For example, the server computer 26 may be provided by a plurality of web servers, active directory servers, database servers, email servers, exchange servers, and communication servers, in a manner that is well known. Database 14 is best understood as a data centre, as is explained below. It should be understood that the present invention contemplates a plurality of server computers, or even several of the data centers contemplated by the present invention.

The server computer product 28 of the present invention is installed on the server computer 26. Also, as best shown in FIG. 2, the server computer product 28 in co-operation with said server computer 26 provides a communication means 32; a display means 34; a data exchange means 36 and an administration facility 38. The server computer product 28 of the present invention also includes a data discrimination means 200. The present invention also contemplates that the server computer product 28 includes a known data storage means for storing data to database 14 (not shown) and backup/recovery means (also not shown), both provided in a manner that is known.

The client information is provided to the administration facility 38, including the TCP/IP addresses of the various gateway devices 18 associated with each particular client 10. Or, in a particular embodiment of the present invention, a function of the gateway loader program 102 is to provide to the administration facility a unique identifier for each gateway device 18 (such as a serial number) when the gateway program 27 is loaded to each gateway device 18. In this manner each gateway device 18 deployed in accordance with the present invention is already known to the server computer 26 when a gateway electronic communication 33 is received from an approved gateway device 18.

Therefore, in accordance with this aspect of the present invention, data discrimination means 200 is adapted to discriminate between data received from the gateway devices 18 and associated with clients 10, and unrelated data. Unrelated data is either ignored or published to a table in a manner that is known that permits personnel of the operator of the present invention to confirm that the data is truly unrelated. Data that is recognized by the data discriminations means 200 is processed by the data exchange means 36 as particularized herein.

One aspect of the administration facility 38 is a tool whereby the operator of the present invention can configure the gateway devices 18. This is conducted either on-line via a web based tool or through a direct connection using an Ethernet cable, in a manner that is known. Either way, in this particular implementation of the present invention a form or web form is used to select the appropriate configurations in a manner that is known. Clients 10 of the operator can also be given access to this very same tool to send "control messages" as described below, including for the purposes of modifying the programming of the gateway device 18. For example, the web form described herein may contain fields including "IP ADDRESS", "SUBNET MASK", "DEFAULT GATEWAY", "DNS SERVER", "SITE ID", "PROXY SERVER", "PROXY USERNAME", "PROXY PASSWORD", "SERVER TCP PORT", "USER NAME", "PASSWORD", "DEBUG LEVEL", as well as other fields to modify the range of values 29 or other programming as may be necessary.

The data exchange means 36 stores data communicated by the gateway device 18 on an ongoing basis. Specifically, in a particular embodiment of the present invention, the gateway electronic message 33 contains not only the signal data 12, but also the TCP/IP address of the gateway device 18. The gateway electronic message 33 also includes the identity of the device connected to the gateway device 18 from which the signal data 12 originated, if applicable. This TCP/IP address and device identity data, or source data, is used by the data exchange means 36 to tag the signal data 12 in a manner that is known. Accordingly, the signal data 12 relating to specific gateway devices 18 or electronic devices connected to a particular gateway device 18 are readily retrievable from the database 14 in a manner that is known. It should be understood that database 14 of the present invention is a hierarchical database that supports queries across its contents, such that data associated with one particular client 10 is retrievable from the database 14 across a plurality of gateway devices 18, the plurality of connected electronic devices 21 or management systems 23, and across a plurality of locations.

Another aspect of the administration facility 38 is management of access to the data exchange means 36. Specifically, the administration facility permits the operator of server computer 26 to administer hierarchical access by clients 10 to the system of the present invention, in a manner that is well known. In particular, administration facility 38 allows administration of security, membership profiles and preferences, in a manner that is well-known.

The operator of the administration facility 38 provides one or more user name/password combinations to clients 10. The administration facility 38 further provides an access facility 42 which is used by authorized users of the client 10 in order to access the resources of the system by providing the user-name/password combination referred to. Database 14 is provided in a manner that each client 10 can only access its own data, in a manner that is known.

The administration facility 38 provides access by authorized users to a preferences facility 44 which is also provided in a manner that is known. The preferences facility 44 allows authorized users to customize a number of aspects of the services provided by the system of the present invention. For example, the preferences facility 44 in association with the display means 34 displays a list of the gateway devices 18 and any related additional electronic devices 21 that are associated with the particular client 10. The list may comprise a unique identifier for such devices. The authorized user has the option of tailoring the names of such devices, such that they are recognizable to the authorized user who will obtain alarm messages 46 from the system of the present invention, as explained below. The names or point names provided may relate to the location of particular devices, or some other identifier of importance to the authorized user.

The preferences facility 44 also permits the authorized users to program the server computer product 28 to act in accordance with their business rules 40, including specifically in relation to the manner in which signal data 12 is communicated to authorized users by the server computer 26 in the form of signal data or alarm messages 46. Alarm messages 46 include an email message sent via the communication means 32. The preferences facility 44 provides a series of known interfaces for permitting authorized users to select their preferences regarding the recipient of alarm messages 46, the manner in which certain alarm messages 46 meeting certain threshold values may be escalated, for example, to defined priority levels, or by copying yet another authorized user, or security force, or emergency response team or the like. These business rules 40 are saved in a business rules repository, as part of the database 14. The server computer product 28 automatically processes data of each customer in function of their particular business rules 40.

One example of escalation, is that if the alarm message 46 contains data that a particular device connected to a gateway device 18 is not functioning, then preferences facility 44 has been provided with the email address or pager number of a service person, the communication means 32 will contact such service person, providing the particulars of the alarm message 46, including for example the location of the device in question.

A sample of a particular alarm message 46 is reproduced below for illustrative purposes only:

| From: | Dimax Controls Monitoring |
|---|---|
| Sent: | Saturday Jun. 15, 2002 8:00:10 AM |
| To: | Jon Russell |
| Subject: | Dimax System Notification |
| Point Alarm: | |
| Date/Time: | Jun. 15, 2002 08:00:02 |
| Site: | Dimax Head Office |
| Point Name: | EAS_AIR_FAN |
| Point Status: | Digital Alarm |
| Current Value: | RUN |
| Engineering Unit: | STOP/RUN |

It should be understood that preferences facility 44 also permits the authorized user to tailor the information first displayed by display means 34 when the resources of the server computer 26 are accessed. For example, the authorized user may wish to see the following pages designated by tabs in a known web interface: "HISTORIES", "ALARMS", "LOGINS", "SYSTEM MESSAGES" and "ERROR MESSAGES", in a typical implementation of the present invention.

In yet another aspect of the present invention, the gateway program 27 is responsive to control messages (not shown) received from the server computer 26. These control messages may contain instructions for modifications to the range of values 29 associated with a particular gateway device 18, whereby upon receipt of such instructions, gateway program 27 in a manner that is known is adapted, after the receipt of such instructions, to process and forward signal data 12 as explained above in accordance with the new range of values 29. The preferences facility 44 of the present invention permits the authorized user of the client 10 to input such amended range of values 29 which as described above is then distributed to relevant gateway devices 18. Information from the server computer 26 could also be sent to the gateway to cause a change in the devices 21 or the management systems 23. This information would be given by the clients 10 with appropriate access privileges and relayed to the gateway 18.

It should be understood from the above that one of the advantages of the present invention is that the dispatch of alarm messages 46, for example, in accordance with the then current business rules 40 is achieved across numerous gateway devices, over possibly numerous locations, very easily and effectively.

Another aspect of the present invention is reporting by means of the reporting facility 54. The reporting facility 54 is best understood as an application program that permits the database 14 to be queried for data associated with a particular client 10, and then reported in accordance with the preferences of the client 10, across a plurality of gateway devices 18. The preferences facility 44 provides means for defining a plurality of client 10 specific reports. These may be selected from a menu of pre-programmed reports, or in another aspect of the present invention, the preferences facility 44 gives access to a report building tool 58 that is provided in a manner that is known. The report building tool 58 is responsive to input of logic commands provided in a number of fields which may include instructions for building tools. The logic commands correspond to parsing rules such that when the requisite fields are completed by an authorized user and the particular report is "SAVED", the reporting facility executes the commands or parsing rules to run the report so built.

The reporting facility 54 is responsive to requests from authorized users to access the database 14 by means of the data exchange means 36 to generate specific reports based on client specific data. These reports can be provided in a number of viewable formats in cooperation with the display means 34. For example, display means 34 is adapted to display reports in HTML such that they can be read in a browser. Alternatively, reports can be exported as a .txt file or published to MICROSOFT WORD™ or .pdf format or other file formats and then downloaded, or forwarded to another email address. For example, a monthly report on a specific topic based on client 10 data that was sent by gateway devices 18 for that client 10 could be sent by electronic mail to a predetermined electronic mail address.

These reports include, for example:

"TODAY's ALARMS" which contains that days signal data 12, including alarms, with all relevant information across the various locations, gateway devices 18 etc.

"POINT ALARM QUERY" which provides live monitoring of a particular location, facility or device.

"GENERAL ALARM QUERY" which usually contains messages with instructions such as "CHANGE THE FILTER ON ROOFTOP UNIT". The same is true for an alarm message 46 based on the same signal data 12. The exact text of the message either comes from a management system 23 or is programmed using the report building tool 58. This is yet another benefit of the present invention in that central monitoring in accordance with this invention promotes the ability of employees to act on alarm messages 46 or reports without having to interpret data supplied by the various electronic devices 21 and/or management system 23. This is because the central operator may on an ongoing basis update the parameters of the provisioning of the server computer such that alarm messages 46 are understood by the appropriate personnel.

"LIGHT ALARM QUERY". This report includes alarm messages related to the health of a management system 23 such as a BMS. These systems generally have a self-monitoring facility such that an alarm is generated in "YELLOW LIGHT" conditions, for example, when a battery is low.

These alarm messages 46 and reports based on same are provided for illustrative purposes only. The present invention contemplates many additional reports depending on the various signal data 12 that could be generated by the electronic devices 21 or management systems 23 of customers, as well as the reports that they may require based on such signal data 12.

It should also be understood that the present invention contemplates real time updating of the client data accessible by mean of the data exchange means 36. For example, as mentioned earlier, where an authorized user is logged on to the system of the present invention, and new signal data 12 is received by the server computer 26 that relates to the client 10, that data will be displayed by display means 34 on the screen shown to the authorized user at the time. This is done without need to refresh the screen, in a manner that is known, for example by maintaining during a user session a socket connection for duration of that session, such that a servlet process remains open and obtains relevant updates to from the database 14 with minimal delay.

Again, it should be understood that the database 14 is provided in a manner that clients 10 can gain access only to their own data. Specifically, this is achieved, for illustrative purposes, by tagging data stored in the database 14 such that it is tagged in accordance with the source thereof, i.e. the specific electronic device 21 from which the data originates. Also, within database 14, data originating from particular electronic devices 21 is associated with a particular client. Accordingly, queries to the database 14 by a particular client are supported such that a client is only able to access its own data by submitting queries, in a manner that is known.

For the sake of clarity, it should be understood that while the gateway devices 18 are by their nature digital devices, they may be connected to analog devices thereby being capable of interpreting analog signal in a manner that is know. In this manner the signal data 12 communicated by gateway devices 18 to the server computer 26 may include analog as well as digital values.

One aspect of the present invention is that the administration facility 38 provides means for programming how often a message is to be expected from particular gateway devices 18. Therefore, if a message is not received at an expected time, a message is sent to the client 10, in accordance with the business rules 40 for that client, as particularized below. The gateway device 18 is configured to send a message to the server computer 26 at regular intervals to ensure that the gateway devices 18 are still functioning and connected to the Internet, even though signal data 12 may not have been received recently.

Specifically, server computer product 28 may also include a "HEARTBEAT" function such that on an intermittent basis a message is sent out from each gateway device 18 to the server computer 26. The server computer 26 is set up with business rules 40 according to the client's requirements, to measure the time gap between messages from each device. When an abnormally long delay between messages is detected in the server computer 26, an alarm message 46 can be generated or forwarded by e-mail as a notification of the loss of communication.

In operation, if signal data 12 is not being received from a gateway device 18 even though the gateway device 18 itself is receiving signal data 12 from the connected electronic devices 21 or management systems 23, it is generally the Internet connection that is down, not the gateway device 18 itself that is not functioning. Another aspect of the present invention is that the gateway program 27 buffers messages when the Internet connection is down, such that once the Internet connection is live again, any accumulated messages are sent to the server computer 26.

Therefore communication means 32 provides means for the various clients 10 via the various client computers 16 connected to the Internet 22 to communicate with server computer 26 and thereby access the features thereof described in this disclosure. As is best understood by referring to the explanation of the display means 34 above, the communication means 32 provides means for transferring data to, and receiving data from, the data exchange means 36 by flat files such as e-mail or FTP (File Transfer Protocol) for transfer and receipt via the Internet. The communication means 32 also provides means for creating direct interfaces between the data exchange means 36 and the computer systems of various clients 10, for example, by means of secure VPN's (Virtual Private Network) or existing VAN connections, in co-operation with such inter-system communication methods such as SOAP, XML, Message Queuing, HTTP/HTTPS, SMTP, Direct COM interfaces and the like. All such interfaces are provided in a manner that is well-known.

The database 14 of the present invention also provides in co-operation with data exchange means 36 a data archive means 60 for archiving specific signal data 12. It should be understood that in certain business environments, for example, in relation to food manufacturing or pharmaceutical manufacturing, the proof of environmental or other conditions falling within acceptable ranges over time can be very important. The present invention provides an effective means of receiving data from numerous gateway devices 18 across numerous locations, and archiving same, and accessing same in the form of reports based on such archived data provided to database 14 in a manner that is known, using the reporting facility 54. This includes for example, "THIS MONTH'S REPORTS" or reports for different time intervals, generally across all locations/devices, or for specific location, or specific devices, or specific types of devices across different locations. The present invention allows the distribution of the significant costs associated with fulfilling these functions over several organizations. The data is also purged from the data store 35 thus ensuring that space is available for new messages.

It also should be understood that the proper monitoring of systems such as a BMS, DDC system, HVAC controls, electronic cash register systems, alarm systems, PLCs in use for industrial automation, voicemail systems and so on generally requires monitoring by an employee with adequate training and comfort level with technology. But particularly where there are a number of different systems, distributed over a number of locations, the joint monitoring of such systems becomes quite difficult. This results either in inadequate monitoring, or the need to hire more individuals to monitor the various such systems that may be associated with a particular operator. The present invention, however, provides a manner of providing central monitoring of more than one system, and on a more efficient basis. This permits better monitoring, and more efficient allocation of monitoring resources. In particular the operator of more than one buildings each having a BMS may decide that rather than dedicate an employee to monitoring, at specific times it may wish to receive only certain alarm messages from a plurality of locations.

Other variations and modifications of the invention are possible. For example, numerous other features can be added to the present invention without departing from the spirit of the invention. These include support of different network connections, data security utilities, particular system architectures also supporting the functions described herein, further reporting utilities, disaster recovery utilities, back-up utilities, automated problem resolution, help-desk resolution including automated initiation of help-desk response, on-line FAQ's and the like. In addition, the server computer 26 may be provided by means of distributed servers located regionally to reduce the risk of down time or server failure. In addition, alternate computer systems, enhancements or hardware configurations can be used in providing the system described herein. All such modifications or variations are believed to be within the sphere and scope of the invention as defined by the claims appended hereto.

We claim:

1. A system for collecting and monitoring signal data across one or more electronic devices via the Internet comprising:
  (a) a web server connected to the Internet, the web server including a processor and a memory operatively connected to the processor;
  (b) a web application loaded on the web server;
  (c) a database; and
  (d) a database management utility linked to the database, and responsive to the web application;
  (e) whereby the web application:
    (i) collects signal data from the one or more electronic devices and stores the signal data to the database;
    (ii) provides monitoring for the signal data;
    (iii) is responsive to requests from one or more network connected devices in an authorized transmission to generate a series of web pages that display the signal data to the one or more network connected devices without having to connect directly to each said electronic devices;
  whereby said web application further includes a communication facility responsive to input provided by a client of the web server for automatically disseminating signal data to the one or more network connected devices; whereby the web application is responsive to input defining business rules of a client of the system for disseminating the signal data; and
  wherein the business rules include threshold parameters for escalating signal data to alarm data, and rules for disseminating the alarm data, including based on escalation thereof.

2. A method of collecting and monitoring signal data across one or more electronic devices via the Internet comprising the steps of:
  (a) providing a web server connected to the Internet, the web server including a processor and a memory operatively connected to the processor, the web server further including a web application loaded on the web server, a database and a database management utility linked to the database, and responsive to the web application;
  (b) deploying one or more electronic devices at one or more locations, whereby the one or more electronic devices, or other devices connected thereto, generate signal data;
  (c) loading a communication facility linked to the one or more electronic devices for communicating the signal data to the web server;
  (d) collecting the signal data from the one or more electronic devices known to the web application at the web server by means of the communication facility;
  (e) storing the signal data to the database; and
  providing monitoring of the signal data by means of the database management utility whereby the web application is responsive to requests from one or more network devices in an authorized transmission to generate a series of web pages that display the signal data from the one or more electronic devices to the one or more network connected devices;
  (g) providing as an input to the web application computer instructions defining business rules for disseminating signal data to one or more network connected device; and
  (h) disseminating the signal data based on the business rules by operation of the web application.

* * * * *